INVENTOR:
RALPH E. COUSINO.
BY
Owen & Owen
ATT'YS.

INVENTOR:
RALPH E. COUSINO.
BY
Owen & Owen
ATT'YS.

INVENTOR:
RALPH E. COUSINO.
BY
Owen & Owen
ATT'YS.

INVENTOR:
RALPH E. COUSINO.
BY
Owen & Owen
ATT'YS.

INVENTOR:
RALPH E. COUSINO.
BY
Owen & Owen
ATT'YS.

INVENTOR:
RALPH E. COUSINO.
BY Owen & Owen
ATT'YS.

United States Patent Office 3,420,461

Patented Jan. 7, 1969

3,420,461

ENDLESS MAGNETIC TAPE CARTRIDGE

Ralph E. Cousino, Toledo, Ohio, assignor to Orrtronics, Inc., Perrysburg, Ohio, a corporation of Alabama Filed Dec. 18, 1964, Ser. No. 422,483

U.S. Cl. 242—55.19 9 Claims

Int. Cl. G11b *23/04*

ABSTRACT OF THE DISCLOSURE

A cartridge for an endless sound reproducing tape adapted to be removably received by a tape transport. The cartridge includes a rotating tape supporting platform which is normally locked against rotation and is unlocked when the cartridge is in position within the transport. The cartridge includes tape guide means positioned such that a loop of tape extending from the main coil on the supporting platform is turned to a position at right angles to the tape in the main coil such that the drive capstan and playing head of the transport contact that tape in the loop in a plane normal to the main coil axis. The cartridge further includes means for holding the main coil against movement when the tape supporting platform is in locked position.

The present invention relates to magnetic sound tape recording and reproducing devices and, more particularly, to an improved recording and reproducing device and a removable tape cartridge therefor. Specifically, this invention relates to a recording and reproducing device capable of being used with an improved cartridge for an endless magnetic tape, which cartridge is unique because of the manner in which the tape is presented to the drive capstan and tracking head of the recording and reproducing apparatus as will be specifically detailed below.

Recording and reproducing devices for use with self-threading removable cartridges, such as is disclosed in U.S. Patent 2,911,215, have many advantages over conventional tape recorders in that the cartridges containing individual tapes may be easily changed and also have the advantage that the tape within the cartridge is completely protected from damage when the cartridge is stored outside of the recording device. However, there are several disadvantages in such machines due to the necessary dimensions of the cartridge for use in machines of this type. One such disadvantage is the fact that, due to the thickness of the cartridge, a number of cartridges requires a relatively large storage or stacking space as opposed to conventional flat disc-type phonograph records.

Another disadvantage of many cartridges of the prior art is the fact that the flat coil of endless tape within the cartridge, when the cartridge is stored out of the machine, may become loose and tangled within the cartridge, thereby causing the reproducing apparatus to malfunction when the tangled tape in its cartridge is inserted for playing therein.

Another disadvantage of these cartridge type machines of the prior art results from the manner in which the tape leaves the inner convolution of the annular coil upon the tape disc for presentation to the drive capstan and the tracking head. In prior art endless tape type cartridges, the tape leaving the inner convolution of the flat coil lying upon a rotating tape disc is drawn across the top of the coil in a substantially vertical position and is led around a cylindrical tape guide for presentation to the drive capstan and tracking head in a vertical position. In cartridges of this type, the lower edge of the tape which is drawn across the upper edges of the coil becomes "riffled" and is subject to edge fatigue. This, of course, after prolonged usage, seriously limits the sound reproduction qualities of the tape, causes additional bulk in the coil and impairs the operation of the endless tape cartridge.

Accordingly, it is an object of this invention to provide a sound reproducing device and cartridge therefor in which the cartridge, due to the particular configuration of the tape path therein, is capable of compactly housing the tape within a space at least one-third less than conventional endless tape cartridges known in the prior art.

It is yet another object of this invention to provide a sound reproducing device and removable tape cartridge therefor in which the endless tape, as it leaves the innermost convolution of the tape coil on the rotating disc, is drawn in a substantially horizontal position across the top of the coil and is presented to the drive capstan and tracking head of the reproducing mechanism in a substantially horizontal position or in a position parallel to the plane of the coil on the rotating disc within the tape cartridge.

It is yet another object of this invention to provide a tape cartridge for use with sound reproducing devices in which the endless tape therein is withdrawn from the innermost convolution of the coil of tape upon the rotating tape disc in a manner which prevents riffling or edge fatigue of the tape.

It is still another object of this invention to provide a recording and reproducing device for use with a removable cartridge of endless tape in which the tape is presented to the drive capstan and the tracking head in a substantially horizontal position or in a position parallel to the plane of the tape coil.

If the tape is of the kind that is provided with a plurality of separate sound tracks, the present invention provides a movable tracking head capable of being moved in a horizontal plane into and out of precise alignment with any one of the plurality of separate sound tracks.

Other objects and advantages of the invention will be apparent from the following detailed description of a preferred embodiment thereof, reference being made to the accompanying drawings, in which.

*The removable tape cartridge*

Figures 1, 2:
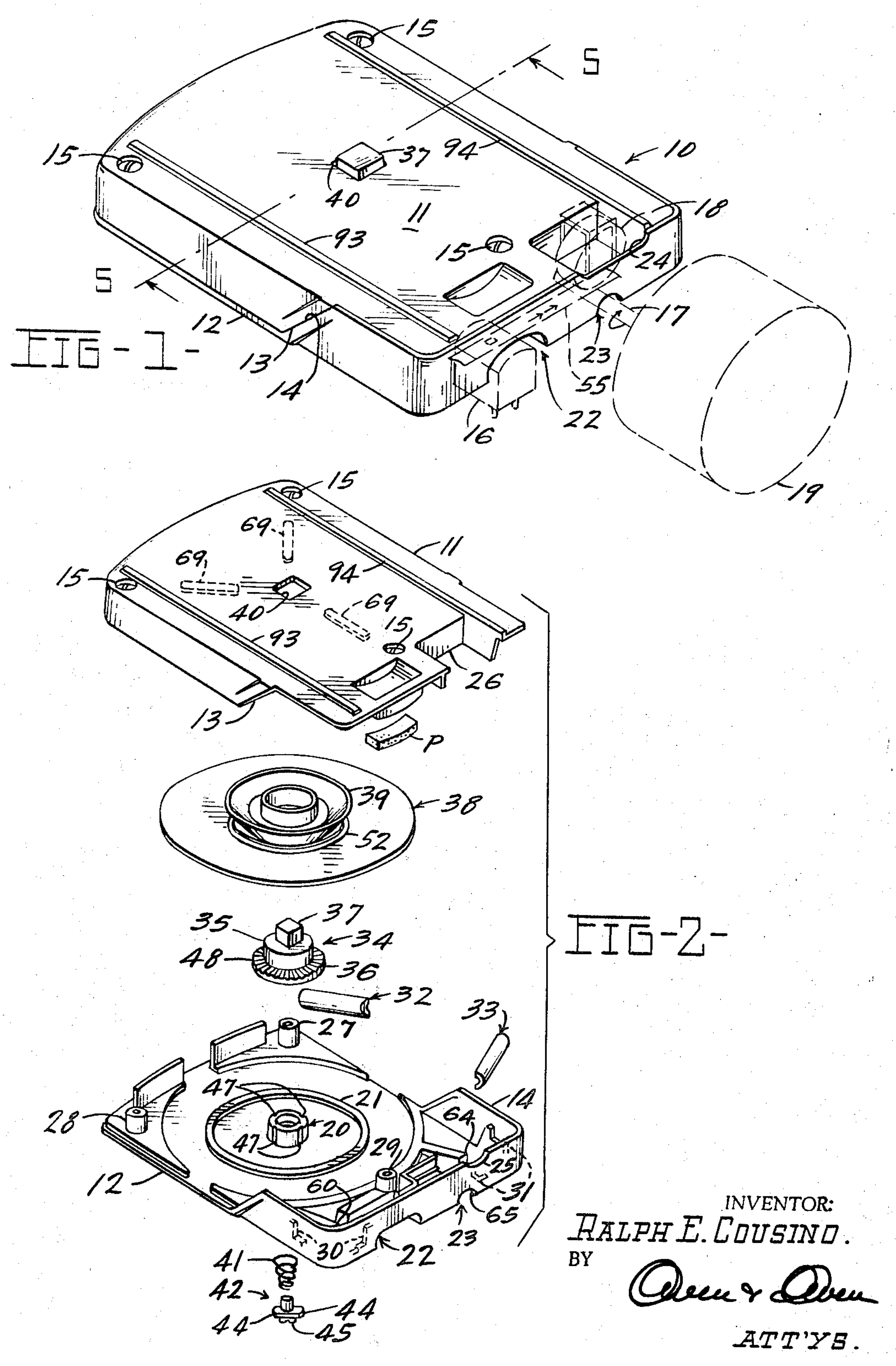
FIGURE 1 is a view in perspective of the removable cartridge for endless tape which is a part of this invention, showing in phantom the position of the indexing tracking head, the drive capstan, and the pressure roll of the sound reproducing device.
FIGURE 2 is an exploded view in perspective of the endless tape cartridge of FIGURE 1, showing the internal parts as they would be assembled without magnetic tape therein.

Referring first to FIGURE 1, the removable cartridge for a magnetic tape, generally indicated by reference numeral 10, is shown including an outer cover 11 secured upon a base member 12 to form an enclosure for the tape therein. As may be seen particularly in FIGURE 2, the cover 11 has a downwardly extending sidewall 13 and the base member 12 has an upwardly extending sidewall 14, which, when the cover 11 and base member 12 are secured to one another by screws 15, form a complete peripheral closure with one another.

Figures 7, 8, 9:
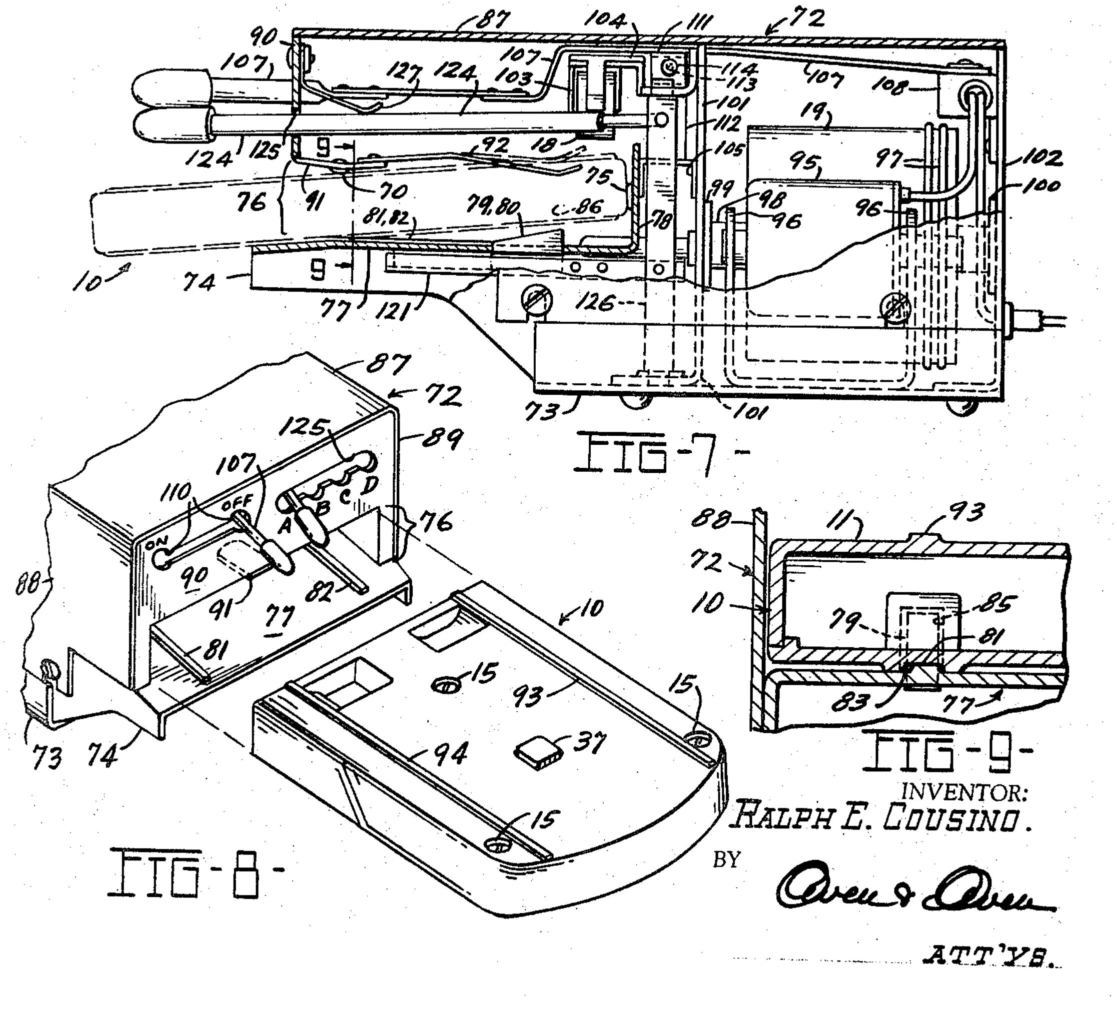
FIGURE 7 is a view in elevation of the sound reproducing device shown in FIGURE 6, partly in cross section, and showing in phantom a tape cartridge of this invention partially inserted therein.
FIGURE 8 is a schematic view in perspective showing the manner of inserting a tape cartridge of this invention within the sound reproducing device of this invention.
FIGURE 9 is a cross-sectional view on an expanded scale taken along line 9—9 of FIGURE 7 and showing the guide rails and cooperating recesses which position the cartridge within the sound reproducing device.

FIGURE 1 shows in phantom the positions of a tracking head 16, a drive capstan 17 and a pressure roller 18 as they are associated with the cartridge 10 when it is inserted in the sound reproducing apparatus of this invention which will be subsequently described in detail. These components, as well as a flywheel 19 on the drive capstan 17 shown in FIGURE 1, are all components of the sound reproducing apparatus and are housed therein. It is important to note the interrelationship between the tracking head 16, the drive capstan 17 and the pressure roller 18 shown in FIGURE 1 with the cartridge 10. The cartridge 10 in FIGURE 1 is shown in a horizontal position as it would be inserted within the sound reproducing device, as schematically illustrated in FIGURE 8. In such position, the axes of the drive capstan 17 and pressure roller 18 are also horizontal and the tracking head 16 is mounted for movement in a horizontal plane. It is to be understood that throughout the following description of this invention that the sound reproducing mechanism and cartridge described herein will operate when somewhat displaced from a horizontal plane so long as the physical relationships previously described between the tracking head 16, drive capstan 17 and pressure roller 18 relative to the plane of the cartridge 10 are maintained, that is, as long as the plane of the cartridge 10 is parallel to the axes of the drive capstan 17 and the pressure roller 18 and the plane of movement of the tracking head 16. Operation at positions other than horizontal is important when the apparatus is used as a mobile unit or is installed in an automobile which necessarily will cause the plane of the cartridge to leave the horizontal during normal driving conditions.

Figures 3, 4:
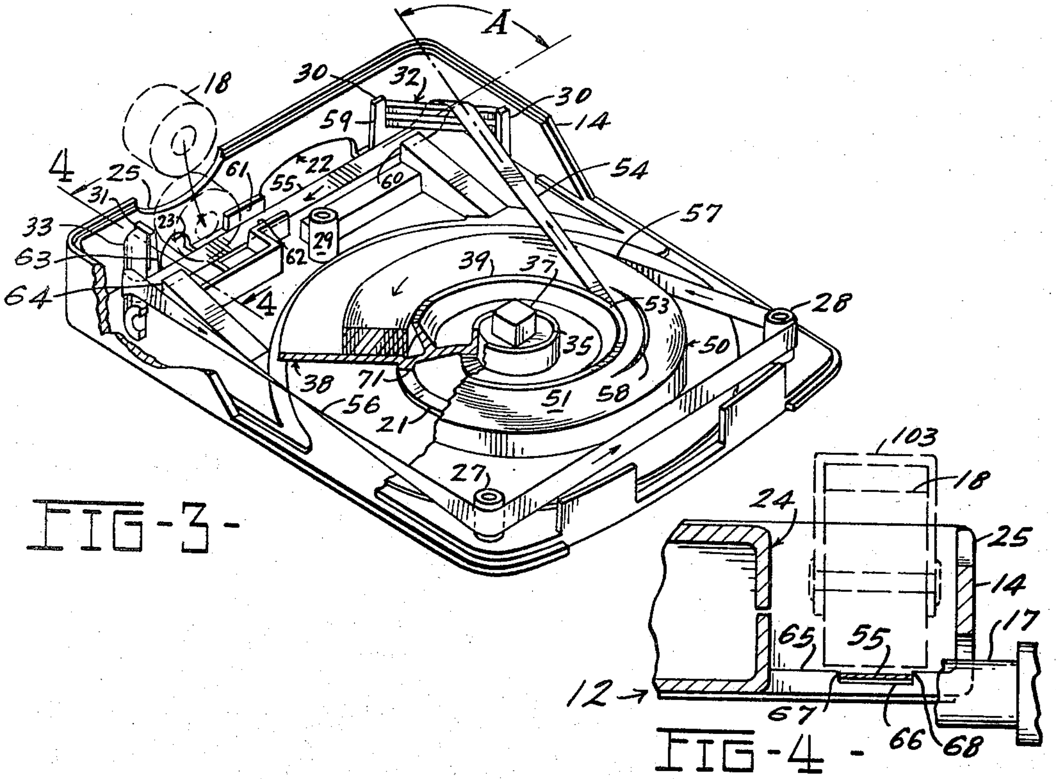
FIGURE 3 is aview in perspective of the tape cartridge of FIGURE 1 with the cover for the cartridge removed to show an endless tape positioned therein and also showing in phantom two positions of the pressure roller of the sound reproducing device of this invention.
FIGURE 4 is a cross-sectional view taken along line 4—4 of FIGURE 3, on an expanded scale, showing in phantom the pressure roll in its lower or drive position and showing the manner in which the upper surface of the base of the cartridge in the area adjacent the drive capstan is relieved to prevent the pressure roll from pinching the tape thereagainst.
Figures 10, 11:
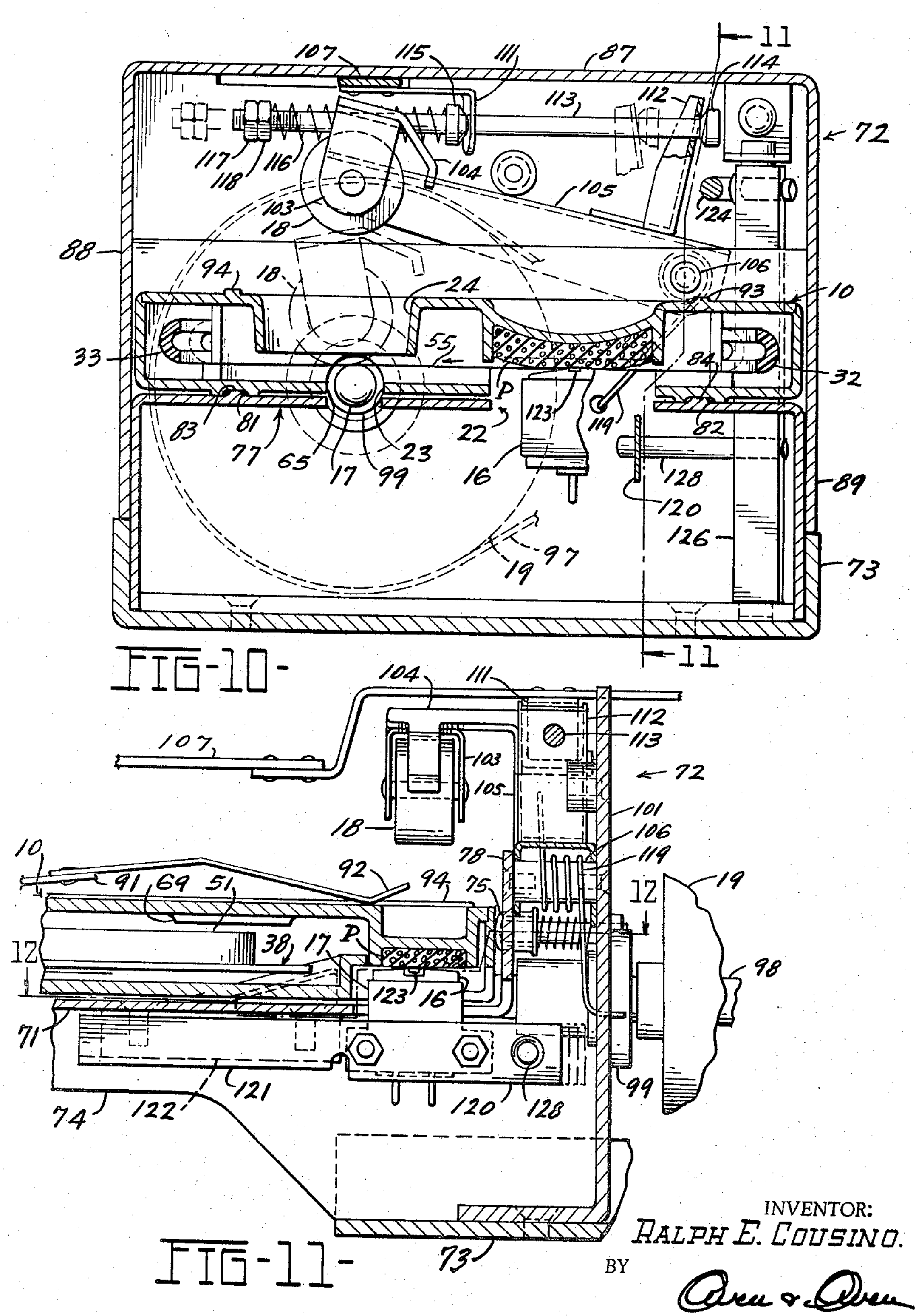
FIGURE 10 is a cross-sectional view in elevation taken along line 10—10 of FIGURE 6, on an enlarged scale, showing the relationships of the indexing tracking head, drive capstan, and pressure roller in its engaged and disengaged positions with the tape cartridge of this invention fully inserted in the sound reproducing device.
FIGURE 11 is a cross-sectional view in elevation taken along line 11—11 of FIGURE 10, showing the details of the indexing mechanism for the tracking head and of the pressure roller engaging mechanism.

As shown in FIGURES 2 and 3, the base member 12 of the cartridge 10 includes an annular bearing journal 20 extending normal to the base member 12 and a concentric support ring 21 integrally formed on the upper surface of the base member 12. Portions of the base member 12 and its sidewall 14 are relieved to form a tracking head opening or aperture 22 and a drive capstan opening or aperture 23. A pressure roll opening or aperture 24 (seen in FIGURE 1) is formed by a cut away portion 25 in the sidewall 14 of the base member 12 and a walled opening 26 in the cover member 11 directly above the drive capstan opening 23. Referring to the edge of the cartridge 10 having the tracking head opening 22 as the front of the cartridge, the cartridge 10 further includes a pair of guide posts 27 and 28 in the rear corners of the base member 12 which also function to support the cover member 11 along with a column 29 near the front of the cartridge. The guide posts 27 and 28 and the column 29 are internally threaded to receive the screws 15 which hold the cover 11 snugly upon the base member 12. Each of the front corners of the base member 12 has a pair of supports 30 and 31 for horizontally extending tape guide members 32 and 33 which are positioned at a predetermined angle with the front of the cartridge 10 as will be explained in detail. Above the tracking head opening 22 is a resilient pressure pad P which presses the tape against the tracking head 16, as shown in FIGURE 10.

Figure 5:
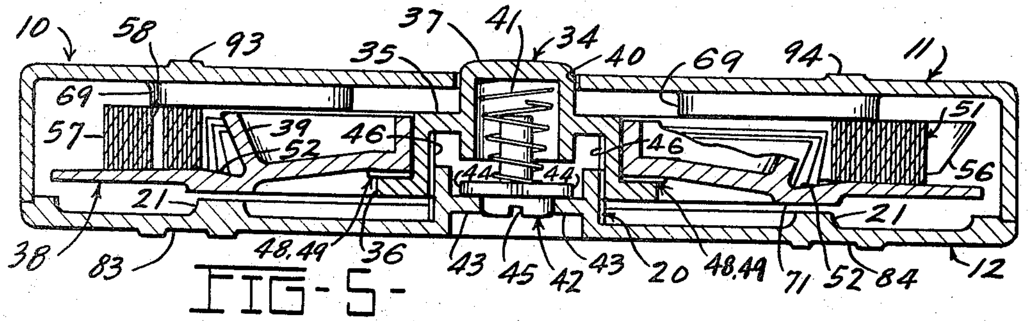
FIGURE 5 is a cross-sectional view taken along line 5—5 of FIGURE 1, on an expanded scale, showing the position of the tape coil and the rotating tape disc when in their upper, locked position, as for instance when the cartridge is not inserted in the sound reproducing device of this invention.
Figure 5A:
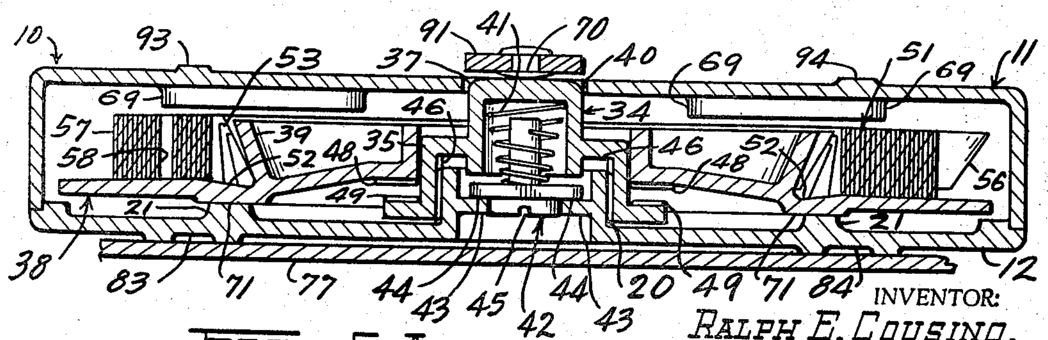
FIGURE 5A is a view similar to FIGURE 5 but showing the tape coil and its rotating tape disc in its lower, unlocked position, such as when the tape cartridge has been inserted in the sound reproducing device of this invention.

A floating bearing 34 having an annular central portion 35, a base portion 36 of increased diameter and a head 37 is placed upon the bearing journal 20, as shown in FIGURES 2, 5 and 5A. A generally planar tape disc 38 having an axially extending, frusto-conical hub 39 is journaled upon the floating bearing 34 whereby the head 37 of the floating bearing 34 extends above the hub 39 of the tape disc 38 and through a complementary shaped aperture 40 in the cover 11. Finally, a spring 41 and its winged support 42, shown in FIGURE 2, are inserted from the bottom of the base member 12 within the bearing journal 20 in the manner shown in FIGURES 5 and 5A to bias the floating bearing 34 upwardly. The annular bearing journal 20 has inwardly extending webs 43 which will allow the wings 44 of the winged support 42 to pass therebetween when the winged support 42 is turned so that the wings 44 are parallel to the radially inward faces of the webs 43. When the winged support 42 is inserted in the bearing journal 20, the wing support may be turned 90° and locked in place so that the wings 44 bear against the webs 43 and the spring 41 pushes the floating bearing 44 upwardly. A screw slot 45 is provided in the bottom portion of the winged support 42 so that it may be rotated for locking or unlocking when assembling or disassembling the tape cartridge 10.

The floating bearing 34 has, on its inner surface, radially extending keys or serrations 46 which are slidably received in complementary grooves 47 in the outer surface of the bearing journal 20, so that the floating bearing 34 will slide axially up and down upon the bearing journal 20 but is prevented from rotation thereon by the serrations 46 and the grooves 47. The upper surface of the base portion 36 of the floating bearing 34 has a number of radial teeth 48, shown in FIGURE 2, and the lower, inner peripheral surface of the tape disc 38 has complmentary radial teeth 49, shown in FIGURES 5 and 5A, which, when mated with the radial teeth 48 on the floating bearing 34, prevent rotation of the tape disc 38 relative to the floating bearing 34, as shown in FIGURE 5.

FIGURE 3 shows the tape cartridge 10 of FIGURE 1 with the cover 11 removed and with an endless tape 50 loaded for operation thereon. The endless tape 50 is positioned in an annular tape coil 51 supported by the tape disc 38 and having a free loop extending between the outermost convolution of the tape coil 51 and on the innermost convolution thereof, next adjacent the hub 39. The theory of operation of endless tapes is well known in the prior art and it is sufficient to point out that when tape is withdrawn from the innermost convolution of the tape coil 51, as shown in FIGURE 3, the tape coil 51 and tape disc 38 are rotated in the direction shown by the arrow in FIGURE 3 due to the fact that tape is being wound upon the outermost tape coil and the difference between the unwinding rate and the winding rate caused by the difference in circumference of the innermost and outermost convolutions is compensated for by the sliding of each of the tape convolutions relative to its neighbor upon the tape disc 38.

An important feature of the invention shown in FIGURE 3 is the manner in which the tape loop extending from the innermost and outermost convolutions of the coil 51 is directed across the front of the cartridge 10 for presentation to the tracking head 16, the drive capstan 17 and the pressure roller 18. The tape is coiled upon the tape disc 38 with its signal receiving oxide base positioned radially inwardly in each of the convolutions as they stand in vertical position. The upper surface of the major portion of the tape disc 38 is generally planar, as shown in FIGURES 2, 5 and 5A, and supports the major portion of the tape coil 51 in a generally flat, annular roll. At the innermost edge of the tape disc 38, adjacent the hub 39, an annular, tapered recess 52 in the upper surface of the tape disc 38 extends around the hub 39 so that several of the innermost convolutions of tape are supported in position lower than the rest of the tape coil 51. FIGURES 5 and 5A show the annular recess 52 and the manner in which the innermost convolutions of tape step down within the recess 52. As the tape disc 38 and tape coil 51 turn in a counterclockwise direction as indicated in FIGURE 3, tape is pulled from the innermost convolution which lies within the annular recess 52 by the drive capstan 17 against which the tape is pressed by the pressure roller 18, as shown in phantom in FIG. 1. As indicated on the left-hand side of FIGURE 5A, the annular recess 52 and the angle of the wall of the hub 39 turn the tape as it approaches the innermost convolution from a generally vertical position to a position which approaches the horizontal, as is indicated by reference numeral 53. As the tape leaves the innermost convolution at 53, it is lead across the top of the tape coil 51 to the first tape guide member 32, shown in FIGURE 3, which turns the tape in this portion of the tape loop, indicated by reference numeral 54, to a horizontal position.

The operation just described has several distinct advantages over endless tape cartridges known in the prior art. First, because the tape is approaching a horizontal position while still within the tape coil 51, as shown in FIGURE 5A, and because the innermost convolutions lie in a plane somewhat below the major portion of the tape coil 51, the tape, as it leaves the innermost coil at 53 is not drawn sharply across edges of the adjacent convolutions but slides across a number of edges of decreasing height, as shown in FIGURE 5A. Second, because the tape is substantially horizontal, any contact with the edges of the adjacent innermost convolutions is made by a flat side of the tape and not with one edge thereof. This prevents edge fatigue and riffling. A third advantage is due to the fact that, because the tape leaves the innermost convolution of the coil 51 and is guided over the tape guide member 32 in a substantially horizontal position, there is no edge riffling between the portion of the loop designated by reference numeral 54 and the upper edges of the tape coil 51. Fourth, due to the fact that the tape is in a horizontal or flat position in the portion designated by reference numeral 54, the overall height of the cartridge, or the clearance between the top of the tape coil 51 and the underside of the cover 11 is reduced. As previously pointed out, this reduction in cartridge height is important in providing a compact cartridge which may be stored in a minimum of available space.

As the tape portion 54 passes around the tape guide member 32 as shown in FIGURE 3, it is turned over so that the oxide face now faces the base member 12 as the tape path passes across the tracking head opening, 22 and drive capstan opening 23. This portion of the tape loop, designated the playing area 55, extends between the tape guide member 32 and the tape guide member 33. The tape, after it passes through the playing area 55, is guided around the second tape guide member 33, which is also positioned to turn the tape over again so that the oxide face leaves the tape guide 33 facing upwardly and to redirect the tape towards the rear of the cartridge and the guide post 27. The tape is turned 90°, as indicated by reference numeral 56, between the tape guide member 33 and the guide post 27 so that the oxide face of the tape as it reaches the guide post 27 now faces inwardly towards the tape disc 38. This turn is necessary in order that the tape be returned to the outermost convolution of the tape coil 51 with the oxide face facing in. This 90° turn, indicated by reference numeral 56, is best made between the tape guide member 33 and the guide post 27 due to the fact that these members are positioned relatively far apart in relation to the other guide members and posts in the cartridge and therefore the 90° turn may be gradually made. As shown in FIGURE 3, the tape leaving the guide post 27 is passed around the guide post 28 and then wound upon the outer periphery of the tape coil 51 as its outermost convolution.

The shape and positioning of the tape guide members 32 and 33, as shown in FIGURES 2 and 3, are critical in order to direct the tape from the tape coil 51 to its playing area in a horizontal position and back again without placing undue stress upon the tape. The tape contacts the gradually rounded surfaces of the guide members 32 and 33 throughout its width which prevents stress at either of the edges and which also facilitates positive turning and orientation of the tape to assume its flat position in the playing area 55. The angle at which the guide post 32 is positioned relative to the path of the tape in the playing area 55 is determined by the angle at which the path of the tape must be turned between the portion 54 and the playing area 55. If this angle is A degrees, as designated in FIGURE 3, the angle between the guide post 32 and the tape in the playing area 55 should be one-half A degrees in order that the tape passing across the guide post 32 be supported throughout its width by the outer surface of the guide post. The angle of the tape guide 33 is determined in a similar manner. The height at which the upper edge of the guide member 32 is positioned is determined by the height of the tape coil 51 and the amount of clearance to be provided in passing the tape loop portion 54 across the top of the tape coil 51. The lower edge of the guide member 32 is positioned closely adjacent the upper surface of the base member 12 so that the tape, in the playing area 55, is directed across the tracking head opening 22 and drive capstan opening 23 closely adjacent the upper surface of the base member. The height of the upper and lower surfaces of the tape guide member 33 is determined in a similar manner.

As illustrated in FIGURE 3, both the tape guide members 32 and 33 and the guide posts 27 and 28 are nonmovable components across which the tape slides. While each of these members could be a roller, it has been found that nonmovable members, as shown, are more economical to manufacture and, when fabricated from a plastic material having a low coefficient of sliding friction, such as Teflon or nylon, they perform quite satisfactorily.

In addition to the advantages already described in the path assumed by the tape loop shown in FIGURE 3, another advantage is due to the fact that the tape loop, as it is wound upon the outer surface of the tape coil 51 at a point designated by reference numeral 57, exerts tension upon the tape within the coil 51 which is concentrated in a portion of the coil away from the position 53 where the tape leaves the coil 51. Because the collection point 57 is advanced in the direction of rotation of the tape disc 38 from the exit point of the tape 53, a tape gap 58, which is present in normal operation of an endless tape mechanism, appears diametrically opposite to the area of greatest tension and is closely adjacent the exit point of the tape 53. This means that a minimum amount of inward pressure from the coil convolutions is exerted on the tape as it leaves the innermost convolution at 53 for the tape loop 54. This further reduces friction and edge fatigue, etc., upon the tape.

One further advantage is due to the fact that the guide post 27 keeps the tape paths on each side of the guide member 33 at a constant angle to each other, regardless of the amount of tape loaded in the cartridge. If the tape were wound upon the outermost convolution of the tape coil 51 directly from the guide post 33, angular position of the tape guide member 33 would have to be changed for optimum operation of each tape load to correspond to the outside diameter of the annular coil 51.

In addition to the components of the cartridge previously described, the base member 12, as shown in FIGURE 3, includes tape channel members 59–64 which accurately position the path of the tape in its playing area 55 as it passes across the tracking head opening 22 and drive capstan opening 23. It is important that the tape be fixed in a predetermined position for two reasons. First, for proper sound reproduction, the angle between the tracking head 16 and the path of the tape 55 (normally 90° and known as the azimuth angle) must be constant. Secondly, for multi-channel operation, the lateral position of the tape in the playing area 55 must be fixed in order that the tracking head may be positioned to play one of a plurality of separate tracks thereon without cross-talk resulting from a partial playing of an adjacent track. As will be later explained, such positioning of a tape within a removable cartridge is particularly difficult due to possible variations in the location of the cartridge within the machine by the operator. Because the tape as directed in the cartridge illustrated in FIGURE 3 is positively guided between the channel members 59 through 64 and is directed in horizontal elevation by the lower edges of the tape guide members 32 and 33, it is placed in the playing area 55 in a predetermined position within the cartridge 10 so that the tape will be presented in a predetermined azimuth and lateral position relative to the tracking head 16 when the cartridge 10 is properly positioned within the sound reproducing machine of this invention.

FIGURE 4 illustrates another feature of the tape cartridge 10 which prevents malfunction of the device which may occur when the alignment of the pressure roller 18 with the tape as it passes across the pressure roller opening 22 and drive capstan opening 23. As shown in FIGURE 1, a portion of the tape in the playing area 55 is gripped between the drive capstan 17 and the pressure roller 18 when in its lower position within the pressure roller opening 24. Because it is desirable to keep the size of the drive capstan opening 23 as small as possible to prevent undue exposure of the tape to sources of injury outside the cartridge 10, it may be possible, if the cartridge is not properly positioned within the sound reproducing apparatus, that the pressure roller 18 may pinch the tape between the leading edge (indicated by reference numeral 65 in FIGURES 2, 4, 10 and 12) of the pressure roller opening 24. To prevent this, a groove 66 is cut into the leading edge 65 and extends into the bottom surface of the base member 12 for a short distance towards the tape guide member 33. The width of the groove 66, as shown in FIGURE 4, is larger than the flat width of the tape but is smaller than the width of the pressure roller 18. Therefore, should the pressure roller 18 strike the leading edge 65 on the base member 12, it will not pinch the tape lying in the groove 66 but will bear only against the corners 67 and 68 adjacent the groove 66. In most instances, contact by the moving pressure roller 18 with these corners 67 and 68 will adjust the position of the entire cartridge 10 and proper operation will be resumed.

Although the cartridge 10 heretofore described provides an enclosure for the endless tape therein which prevents damage from external sources when the cartridge is being handled, it may be possible, if the tape disc 38 and the tape coil 51 thereon are free to rotate when the cartridge is being handled, for some of the tape to be unwound from the tape coil 51 and become twisted or fouled within the cartridge or for a loop to drop through the tracking head opening 22 or drive capstan opening 23 and become damaged. Therefore, a locking mechanism is provided to prevent rotation of both the tape disc 38 and the tape of the annular coil 51 within the cartridge 10 when it is outside the reproducing device of this invention. FIGURES 5 and 5A illustrate, respectively, the tape disc 38 and annular coil 51 in locked and in unlocked position. In addition to the components previously described, the locking mechanism includes a plurality of downwardly extending, rubbing bars 69 which are integrally formed on the inner surface of the cover 11 and are positioned above the tape coil 51 around the hub 39 when the cover 11 is secured upon the base member 12. The rubbing bars 69 are located so as not to interfere with the portion of the tape loop 54 which leaves the innermost convolution of the annular tape coil and extend radially of the tape coil 51 throughout its upper surface, from the innermost convolution adjacent the hub 39 to the outermost convolution. Referring to FIGURE 5, the floating bearing 34, the tape disc 38 and tape coil 51 are pushed upwardly by the spring 41, as previously explained, so that the upper surface of the tape coil 51 is held in frictional engagement with the lower surfaces of the rubbing bars 69. In this position, rotation of the tape disc 38 relative to the floating bearing 34 is prevented by the radial teeth 49 on the lower inner periphery of the tape disc 38 which intermesh with the radial teeth 48 on the upper surface of the base portion 36 of the floating bearing 34. Thus, the tape disc is positively locked against rotation by the floating bearing 34 and the tape coil itself 51 is also prevented from movement by contact between the lower surfaces of the rubbing bars 69 and the upper surface of the tape disc 38.

Insertion of the locked tape cartridge 10 into the sound reproducing apparatus, schematically shown in FIGURE 8, will automatically unlock the tape disc 38 and tape coil 51 in the following manner. As may be seen in FIGURE 7, a portion of the sound reproducing mechanism above the path of the cartridge 10 has a downwardly extending detent 70 which, when the cartridge 10 is fully inserted in the manner shown in FIGURE 8, presses upon the head 37 of the hub 39 as shown in FIGURE 5A. With the hub 39 depressed into its downward position against the force of the spring 41, the taped disc 38 and coil 51 are in the position shown in FIGURE 5A where the lower surface 71 of the tape disc 38 rides upon the support ring 21 on the inner surface of the base member 12. The initial downward movement of the floating bearing 34 will release the upper surface of the tape coil 51 from frictional engagement with the rubbing bars 69 and further downward movement of the floating bearing 34 will separate the radial teeth 48 of the floating bearing 34 from the radial teeth 49 on the tape disc 38. Therefore the tape disc 38 is free to rotate about the floating bearing 34 and the tape coil convolutions are free to slide against each other on the upper surface of the tape disc 38. In a reverse manner, removal of the cartridge 10 from the sound reproducing apparatus will release the head 37 from the force exerted by the detent 70 and the spring 41 will again urge both the tape disc 38 and the tape coil 51 to the locked position shown in FIGURE 5.

It is to be noted that the tape cartridge 10 previously described is designed for operation when in a horizontal position with the tape coil 51 resting upon the upper surface of the tape disc 38. As previously indicated, however, it will operate when not in a horizontal position and, with a simple modification to the rubbing bars 69, will operate in a completely inverted position. In place of the rubbing bars 69, a generally planar, continuous annular support member large enough in diameter to support the tape coil 51 if the cartridge were inverted may be provided to support the tape coil 51 on the inner surface of the cover 11. Such a support member, if journaled for rotation, would function as a second tape disc 38 when the cartridge 10 is inverted.

*The sound reproducing mechanism*

FIGURES 6 through 15 illustrate a preferred embodiment of the sound reproducing device of this invention to be used with the removable tape cartridge 10 previously described. Referring to FIGURES 7 and 8, the sound reproducing device, generally indicated by reference numeral 72, includes a bottom panel 73 including a forwardly extending lip 74. A spring biased cartridge bumper 75, best seen in FIGURE 11, is located on the inner end of the cartridge slot 76 formed by a horizontal cartridge support 77 and a vertically extending stop member 78 in the inner end of the cartridge slot 76. A pair of spaced apart, vertically projecting dogs 79 and 80, and a pair of spaced apart guide tracks 81 and 82 which extend from the outer edge of the lip 74 inwardly to the stop member 78 are formed in the upper surface of the cartridge support 77. The guide tracks 81 and 82 are slidingly received by correspondingly positioned guide grooves 83 and 84 in the lower surface of the tape cartridge 10 (shown in FIGURES 5 and 5A) when the cartridge 10 is inserted within the slot 76 with its lower surface adjacent the cartridge support 77 as shown in FIGURE 8. The lower surface of the cartridge 10 also includes a pair of spaced apart seats 85 and 86 which receive the dogs 79 and 80 on the cartridge support 77 when the cartridge is fully inserted within the reproducing device 74. FIGURES 3 and 7 best illustrate the location of the seats 85 and 86.

The sound reproducing device 74 further includes a cover member 87 having downwardly extending sidewalls 88 and 89 and a front panel 90. The sidewalls 88 and 89 are removably secured to the bottom panel 73, as shown in FIGURE 8, and the front panel 90 includes a return flange 91, shown in FIGURE 7, which supports the detent 70 which releases the floating bearing 34 of the cartridge 10, as previously explained. A leaf spring 92 is also secured to the return flange 91 and extends rearwardly and downwardly into the cartridge slot 76, as shown in FIGURE 7.

*Positioning the cartridge with the sound reproducing device*

As previously explained, it is essential that the removable cartridge 10 be positioned within the device 74 in a fixed predetermined relationship so that the tracking head 16, drive capstan 17 and pressure roller 18 will be positioned properly in relation to the tape in the playing area 55. This is accomplished by cooperation between the guide grooves 83 and 84 and seats 85 and 86 in the bottom surface of the cartridge 10 and the guide tracks 81 and 82 and dogs 79 and 80 in the upper surface of the cartridge support 77 and the cartridge bumper 75. When the cartridge 10 is placed upon the cartridge support 77 in the manner indicated by FIGURE 8, it is pushed inwardly by the operator until the leading lower edge of the cartridge rides up over the forward edge of the guide dogs 79 and 80 as indicated in FIGURE 7. Upward movement of the leading edge of the cartridge 10 is opposed by the force of the leaf spring 92 upon the top of the cover 11 so that when the cartridge is fully inserted to the point where its front wall strikes the cartridge bumper 75, and where the seats 85 and 86 are now aligned with the dogs 79 and 80, the spring 92 forces the front end of the cartridge 10 downwardly so that it lies flat upon the cartridge support 77. In this position, the cartridge 10 is prevented from moving forward by the cartirdge bumper 75, prevented from moving backward by the dogs 79 and 80 within the seats 85 and 86, and is prevented from lateral movement by the guide tracks 81 and 82 within the guide grooves 83 and 84. Thus the cartridge 10 is held in its predetermined position with reference to the tracking head 16, drive capstan 17 and pressure roller 18, as previously explained. FIGURE 9 shows in detail the inter-relationship between the dogs 79 and 80 and the seat 85 and the guide track 81 and its guide groove 83.

When the cartridge 10 is to be removed, downward pressure exerted by the operator at the rear end of the cartridge, in the position indicated by the arrow in FIGURE 7, will tilt the front end of the cartridge 10 upwardly to release the dogs 79 and 80 from their seats 85 and 86 and the cartridge 10 may then be removed by pulling it out.

A pair of stacking rails 93 and 94 extend lengthwise along the top surface of the cover 11 and are best seen in FIGURES 1, 2, 5, 5A, 8 and 9. The stacking rails 93 and 94 serve no function in positioning of the cartridge 10 within the device 72 but are spaced apart the same distance as are the guide rails 81 and 82 in the cartridge support 77 so that a number of cartridges may be stacked upon one another outside of the machine.

*Operation of the pressure roller 18 and drive capstan 17*

FIGURES 6 through 15 illustrate a preferred embodiment of the sound reproducing device 72 in which the pressure roller 18 is manually engaged against and disengaged from the drive capstan 17 to cause movement of the tape across the tracking head 16. As previously explained, when the pressure roller 18 is in a lower position pressing the tape against the drive capstan 17, friction between the oxide surface of the tape and the drive capstan 17 will pull the tape past the tracking head 16 at a uniform speed for sound reproduction. When the pressure roller 18 is disengaged in its upper position, as shown in FIGURES 7 and 10, the tape may contact the drive capstan 17 but there will not be sufficient pressure thereon to move the tape.

Figure 6:
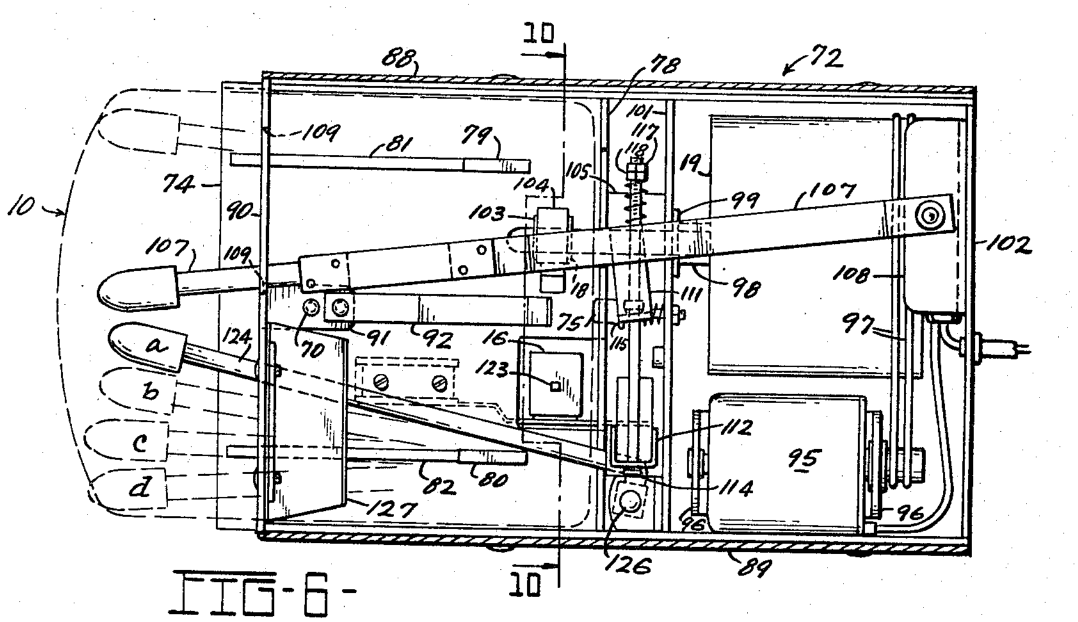
FIGURE 6 is a plan view of a preferred embodiment of the sound reproducing device of this invention, partially in cross section, showing the relationship of the pressure roll control arm and the tracking head indexing arm.

As shown in FIGURES 6 and 7, the rearmost portion of the sound reproducing device 72 contains an electric drive motor 95 secured to the bottom panel 73 by a mounting bracket 96. The motor is coupled to the drive capstan 17 and its flywheel 19 by an endless belt 97. A rotating axle 98 for the flywheel is an integral part of the drive capstan 17 and is journaled in bearings 99 and 100 which are secured to a vertical wall 101 and a back panel 102 of the sound reproducing device 72.

The pressure roller 18 is journaled for rotation in a channel member 103 which is mounted on one end of an arm 104 which extends from the free end of a pivot leg 105, as best seen in FIGURES 10 and 11. The pivot leg 105 is mounted for reciprocation upon a shaft 106 which is secured to the vertical wall 101. The lengths of the arm 104 and the pivot leg 105 are such that the pressure roller 18, in its lower position, will contact the drive capstan 17 at a position where the axis of the pressure roller 18 is not in vertical alignment with the axis of the drive capstan 17 but is advanced a small distance in the direction of the movement of the tape in the playing area 55, as shown in FIGURE 10.

The pressure roller 18 is operated from the front of the sound reproducing device 72 by an actuator arm 107 which is pivoted on a switch housing 108 mounted on the back panel 102, as best seen in FIGURES 6 and 7, and extends forward above the vertical wall 101 and through a slot 109 in the front panel 90. As seen in FIGURE 8, the slot 109 is enlarged at each end to form catches 110 which hold the arm 107 in a position at either end of the slot 109. The slot 109 is positioned below the point where the actuator arm 107 is pivoted on the switch housing 108 so that the actuator arm 107 presses against the upper surface of the slot 109 and must be manually depressed by the operator before being moved out of the catches 110 for movement from one end of the slot 109 to the other.

As seen in FIGURE 10, an L-shaped bracket 111 is secured to the actuator arm 107 for movement therewith and in vertical alignment with the pivot leg 105. A channel member 112 is secured to the top surface of the pivot leg 105 near its pivot point on the shaft 106 and a horizontally extending slide shaft 113 extends through the upper portion of the channel member 112 and the return arm of the L-shaped bracket 111. A stop member 114 is secured to the end of the slide shaft 113 adjacent the channel member 112 and a sliding sleeve 115 is located on the slide shaft 113 to the left of and adjacent to the return arm of the L-shaped bracket 111. A spring 116 is held under slight compression between the sliding sleeve 115 and an adjusting nut 117 and a stop nut 118. A torsion spring 119, best seen in FIGURE 11, is circumjacent the shaft 106 and urges the pivot leg 105 and the pressure roller 18 to their upper positions. When the pressure roller 18 is in its upper position, the actuator arm 107 is fully to the right in the slot 109 in the "Off" position shown in FIGURE 8.

Movement of the actuator arm 107 by the operator from its "Off" position in the slot 109 to its "On" position at the other end of the slot 109 will engage the pressure roller 18 against the drive capstan 17 in the following manner. Referring to FIGURE 10, movement of the actuator arm 107 and the L-shaped bracket 111 to the left will cause the sliding sleeve 115 to move along the slide shaft 113 and compress the spring 116 against the nuts 117 and 118. The spring 116 is compressed until the force required for further compression, which is exerted upon the upper end of the channel member 112 by stop member 114, creates a counterclockwise moment about the shaft 106 which is larger than the clockwise moment caused by the torsion spring 119 circumjacent the shaft 106. Further movement of the actuator arm 107 to the left will turn the pivot leg counterclockwise about the shaft 106 until the pressure roller 18 contacts the drive capstan 17, at which point the actuator arm 107 has reached the other end of the slot 109 and moves upwardly into the catch 110 therein. In this lower or drive position of the pressure roller 18, a constant force is maintained upon the drive capstan 17 by the spring 116 which transmits its compressive force to the stop member 114 and the channel member 112 to urge pressure roller 18 against the capstan 17.

To remove the pressure roller 18 from contact with the drive capstan 17, the opposite sequence of events takes place, that is, manual movement of the actuator arm 107 downwardly from the catch 110 at the left end of the slot 109 and release of manual pressure will cause the torsion spring 119 to return the pivot leg 105 to its upper position. As the pivot leg 105 moves clockwise, the spring 16 will force the sliding sleeve 115, the L-shaped bracket 111 and thus the actuator arm 107 to the right until the actuator arm reaches the end of the slot 109 and moves up into the catch 110.

The switch housing 108 upon which the actuator arm 107 is pivoted contains a microswitch (not shown) which controls the power to the motor 95. In this preferred embodiment, initial movement of the actuator arm 107 from its "Off" position will close the contacts of the microswitch, thus starting the motor 95 and drive capstan 17. Further movement of the actuator arm 107 will cause the pressure roller 18 to contact the drive capstan 17 while it is revolving, which is desirable in magnetic tape transport mechanisms. It may be desirable in certain instances, depending upon the environment in which the device is used, to provide means for starting the motor 95 which are actuated by placing the cartridge 10 in position upon the cartridge support 77 as will be later pointed out, or to provide means for starting the drive motor by closing contacts of an automobile ignition switch, etc. Such modifications are not considered to be an essential part of the invention described herein.

*The tracking head selector system and its operation*

As previously described, the tracking head 16 is positioned in the sound reproducing device 72 such that placement of the cartridge 10 in its predetermined position on the cartridge support 77 will automatically engage the tracking head 16 with a portion of the tape in the playing area 55 within the tracking head opening 22. For devices limited to single track operation, the tracking head 16, is secured in such position and at the proper azimuth angle. In the preferred embodiment of this invention, a movable tracking head 16 is provided for movement along an axis normal to the path of the tape in the playing area 55 so that the tracking head 16 may be positioned for playing engagement with each of a plurality of separate sound tracks. The axis of the tracking head movement may be at an angle other than 90° to the tape path 55, but this would require a longer movement between sound tracks.

Figure 12:
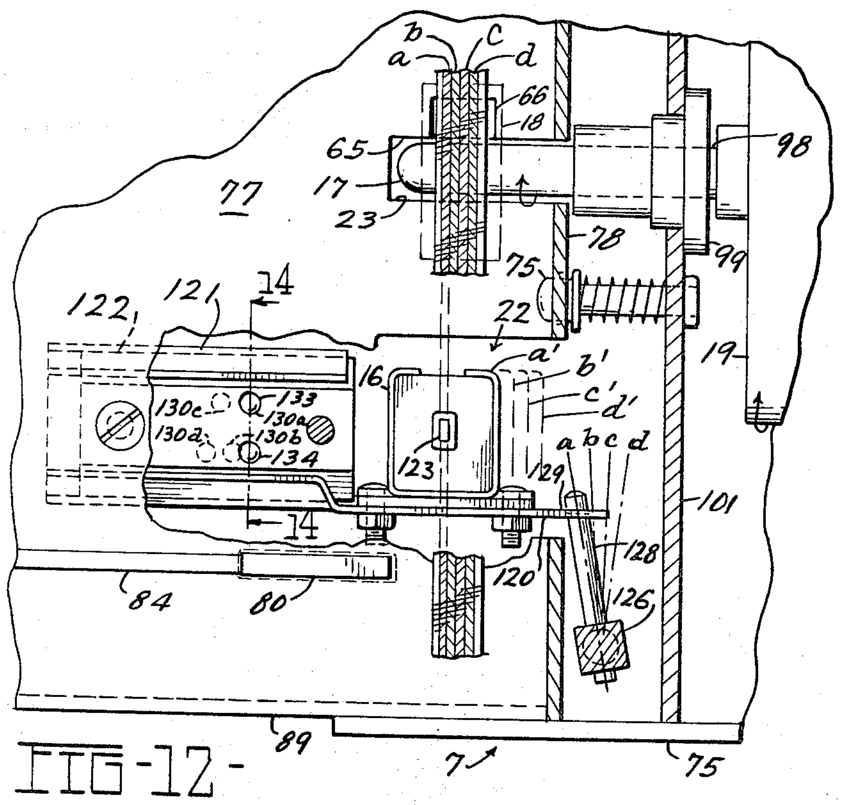
FIGURE 12 is a cross-sectional plan view taken along line 12—12 of FIGURE 11 and shown on an enlarged scale, showing the position of the tracking head and drive capstan of the sound reproducing device in driving and tracking relationship with a portion of the endless tape and also showing part of the indexing mechanism for the tracking head.
Figure 13:
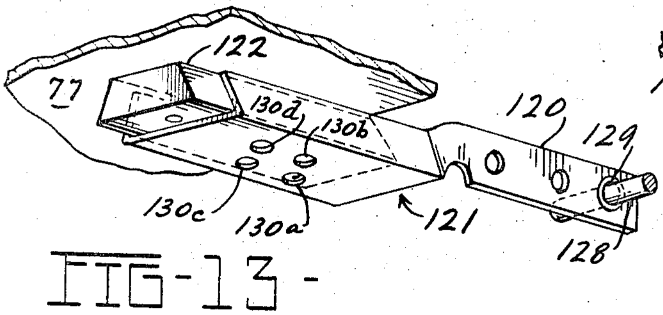
FIGURE 13 is a view in perspective showing a portion of the indexing mechanism for the tracking head shown in FIGURE 12.

Referring particularly to FIGURES 11, 12, 13, and 14, it will be seen that the tracking head 16 is rigidly secured to an arm 120 which extends from one end of a sliding channel 121. As best seen in FIGURE 13, the sliding channel 121 and its arm 120 are slidably associated with a complementary shaped rail 122 which is secured to the lower surface of the cartridge support 77. The major axis of the rail 122 is at right angles to the path of the tape in the playing area 55 so that movement of the sliding channel 121 over the rail 122 is in a path also at right angles to the path of the tape in the playing area 55. The tracking head 16, which is carried by the arm 120, is positioned at the proper azimuth angle of 90° with the path of the tape in the playing area 55 and, because the sliding channel 121 and the tracking head 16 are fixed relative to each other, the azimuth angle remains fixed at 90° regardless of the position of the tracking head 16.

FIGURE 12 illustrates the movable tracking head 16 associated with a section of tape in the tape path 55 having four separate sound tracks. These sound tracks, designated *a*, *b*, *c*, *d*, lie adjacent one another in parallel relationship in the usual manner across the width of the belt. Movement of the tracking head 16 from its position shown in FIGURE 12 at which the pickup 123 is in playing alignment with the sound track *a*, to the positions designated as *b'*, *c'*, and *d'* will align the pickup 123 with sound tracks *b*, *c*, and *d*. As previously described, the tape in the playing area 55 is accurately positioned by the tape channel members 59 through 64 for perfect tracking alignment of the pickup 123 of the tracking head 16 with each of the separate sound tracks *a* through *d*.

Selection of the sound track to be aligned with the pickup 123 is accomplished, in this preferred embodiment, by manual movement of a track selector arm 124 which, as seen in FIGURES 6, 7, and 8, extends through a selector opening 125 in the front panel 90 and terminates at its rear end in a vertically extending pivot shaft 126 which is mounted at the right side of the sound reproducing device 72 adjacent the vertical wall 101. The selector opening 125 has a plurality of recesses on its lower edge corresponding to the number of sound tracks, as indicated by the letters A, B, C, and D. Movement of the track selector arm 125 from one of these recesses to another requires the operator to move the arm 124 upwardly against the bias of a spring clip 127 which is secured to the inner face of the front panel 90, as best seen in FIGURES 6 and 7.

A drive lever 128 extends from the pivot shaft 126 below the cartridge support 77 and passes loosely through a relieved recess 129 in the end of the arm 120 on the sliding channel 121, as best seen in FIGURES 12 and 13. Movement of the tracking selector arm 124 within the slot 125 on the front panel 90 will rotate the pivot shaft 126 and the drive lever 128, causing movement of the sliding channel 121, its arm 120 and the tracking head 16 secured thereto by the drive lever 128. The ratio between the length of the track selector arm 124 to the length of the drive lever 128 is such that a relatively small movement of the tracking head 16 is effected by a relatively large movement of the free end of the tracking selector arm 124. This reverse mechanical advantage, coupled with the tracking head positioning mechanism to be subsequently described, permits the accurate selection of the position of the tracking head 16.

Figure 14:
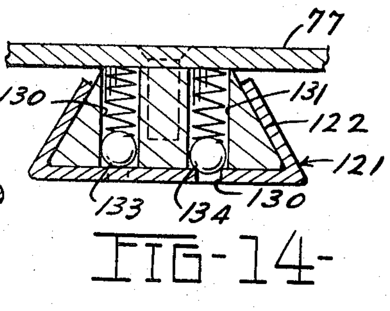
FIGURE 14 is a cross-sectional view of a portion of the indexing mechanism for the tracking head taken along line 14—14 of FIGURE 12 and shown on an enlarged scale.

The lower surface of the sliding channel 121 contains a plurality of staggered holes or recesses 130, which, as seen in FIGURES 12 and 13, are arranged in two rows. A pair of spaced apart passages 131 and 132 extend vertically through the rail 122, as best seen in FIGURE 14, and a spring-loaded detent ball 133 and 134 in each of the passages 131 and 132 presses against the upper surface of the bottom portion of the sliding channel 121. The recesses or holes 130 in the sliding channel 121 are spaced apart a horizontal distance, as viewed in FIGURE 12, corresponding precisely to the horizontal distance which the pickup 123 of the tracking head 16 must move from playing alignment with one sound track to the next adjacent sound track. Thus, the right hand hole **130*a* is horizontally spaced from the next hole 130*b*** by the distance from the sound track *a* to the sound track *b*, etc. The spring-loaded balls 133 and 134 within the passages 131 and 132 in the rail 122 are positioned for alignment with the two rows of recesses or holes **130*a–d* such that movement of the sliding channel 121 along the rail 122 will alternately align either ball 133 or 134 with holes 130*a*** and *c* and **130*b*** and *d*, respectively. FIGURE 12 shows the tracking head 16 in position for playing sound track *a* and the spring-loaded ball 133 has dropped into the recess **130*a* in the sliding channel 121. Movement of the track selector 124 and the drive lever 128 in a clockwise direction as shown in FIGURE 12, will move the tracking head 16 and sliding channel 121 to the right to the point at which the spring-loaded ball 134 becomes aligned with recess 130*b*. Further movement will align the spring-loaded ball 133 with the next recess 130*c* and subsequent further movement will align the ball 134 with the recess 130*d***.

It will be apparent that the accurate positioning of the pickup 123 and the tracking head 16 is determined by the alignment of one of the recesses or holes 130 with one of the balls 133 or 134, although movement is initiated by the track selector arm 124. The enlarged recesses A–D in the lower surface of the selector opening 125 are positioned so that the track selector arm 124 will be in alignment with, say, recess B with the ball 134 is aligned with recess **130*b* in the sliding channel 121. Due to the relatively loose connection between the drive lever 128 and the arm 120 on the sliding channel 121, the positioning of the track selector arm 124 within these corresponding recesses A through D is not critical and are inaccurate or gross movement of this arm will not adversely affect the accurate alignment of the pickup 123** with the desired sound tracks *a–d*. This feature is particularly advantageous in instances where the device of this invention may be installed in an automobile or other environment where the operator is unable to devote critical attention and care to the operation of the track selector arm 124.

Although in the above-described preferred embodiment a manually operated track selector mechanism has been shown, it is contemplated that an automatic or semi-automatic track selector may be easily incorporated for use with the tracking head positioning device previously described. Movement of the tracking head 16 and sliding channel 121 can be effected by a solenoid which is actuated by a timed or automatically initiated electrical signal which may be programmed in accordance with the information recorded on the endless tape. For instance, one method which has been used in the prior art is to provide a conductive strip of aluminum at the end of each one of the sound tracks and means sensitive to the passage of this conductive strip to activate the solenoid to shift the tracking head 16 to another sound track.

*Automatic operation of the pressure roller*

Figure 15:
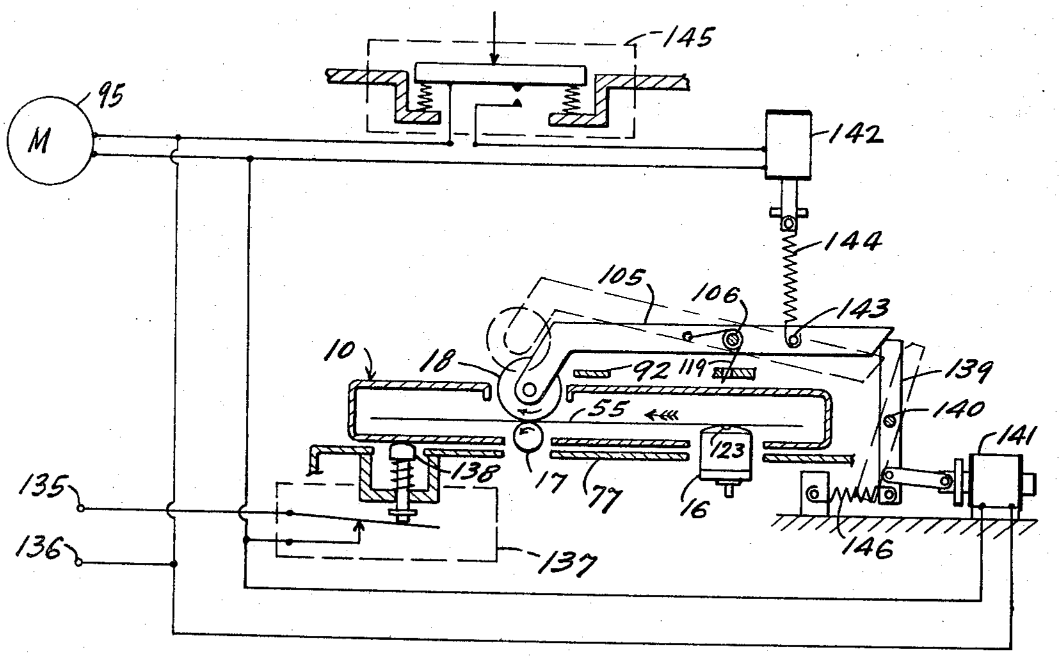
FIGURE 15 is a schematic circuit diagram showing one arrangement of semi-automatic means for controlling the operation of the pressure roller and tracking head of the sound reproducing device of this invention which may be used as an alternate embodiment in lieu of the manually operated means illustrated in FIGURES 6 through 14.

In the preferred embodiment already described, the pressure roller 18 is manually controlled by manipulation of the actuator arm 107. FIGURE 15 shows a schematic circuit diagram of another preferred embodiment in which the engagement and disengagement of the pressure roller 18 and motor 95 is accomplished automatically by placement of the cartridge 10 within the sound reproducing device 72. In this figure, the cartridge 10 is schematically shown in cross section in its position on the cartridge support 77 with the tracking head 16 and drive capstan 17 in engagement with the tape in the playing area 55. The motor 95 for the drive capstan 17 is connected to a pair of power supply terminals 135 and 136 through a spring biased switch 137 which is closed by depressing a plunger 138 which extends upwardly through the cartridge support 77. When the cartridge 10 is placed in operating position, as shown in FIGURE 15, it depresses the plunger 138 and closes the switch 137 to complete the power circuit to the motor 95.

The pressure roller 18 is carried by the pivot leg 105 journaled on the shaft 106 and a locking bar 139 is mounted for rotation on a pin 140. The upper end of the locking bar is positioned to contact the free and of the pivot leg 105 so that it will lock the pressure roller in its downward position, as shown in FIGURE 15. The lower end of the locking bar 139 is connected to a latching solenoid 141 which is connected to the power terminals 135 and 136 through the switch 137. A second solenoid 142 is connected to the pivot leg 105 at a point 143 to the right of the shaft 106 through a spring 144. As in the previously described embodiment, the pressure roller 18 and its pivot leg 105 are held in an upward position by the torsion spring 119, and the spring 144 connected to the solenoid 142 is under slight tension at this position when the solenoid 142 has not pulled in. The solenoid 142, which is a quick acting, relatively powerful solenoid with relation to the latching solenoid, is connected to the power source 135 and 136 through a normally open manual switch 145 which is spring biased in open position and may be mounted for operation from the front panel 90 of the sound reproducing device 72.

When the cartridge 10 is properly positioned on the cartridge support 77, the power circuit to the latching solenoid 141 is completed by closing the switch 137 and the latching solenoid 141 pulls in to rotate the locking bar 139 clockwise from the position shown in phantom in FIGURE 15 to its solid line position where it bears against the end of the pivot leg 105. The operator next depresses the manual switch 145 to complete the power circuit to the solenoid 142 which pulls in and moves the pivot leg 105 clockwise until the pressure roller 18 is in its downward position against the drive capstan 17 and where it is locked by the locking bar 139. The pressure roller 18 remains in this drive position even through the solenoid 142 is no longer actuated because of the holding effect of the locking bar 139. When the power fails or is shut off, the latching solenoid 141 is deactivated and the locking bar 139 is rotated clockwise by the bias of a spring 146 to release the pressure roller 18 and pivot leg 105 which are moved to their upper position by the torsion spring 119.

This arrangement is advantageous in that the movement of the pressure roller 18 and its pivot leg 105 is effected by a solenoid 142 which is designed for quick and powerful movement and yet is not continually energized. The latching solenoid 141 which operates the locking bar 139 may be chosen for relatively small current consumption and will not unduly drain power from the system. This system is also advantageous, especially when the device is installed in an automobile, due to the fact that the pressure roller 18 is released from its position against the drive capstan 17 whenever power is shut off. Long periods of contact between a portion of the pressure roller 18 and the drive capstan 17 may impair the function of the pressure roller 18 and cause a flat spot to be formed thereon, especially at low temperatures. With the above described system, it is necessary for the operator only to depress the manual switch 145 momentarily in order to resume operation of the device, once power has been supplied to the motor 95 and latching solenoid 141. The power terminals 135 and 136 may be connected directly to the ignition system of the automobile or through a manually operated on-off switch as desired.

Other automatic or semiautomatic operations may be incorporated within the system previously described and various modifications to the design of the previously described preferred embodiment for the cartridge and sound reproducing device will be apparent to those skilled in the art. It is understood that such modifications can be made without departing from the scope of the invention, if within the spirit and tenor of the accompanying claims.

What I claim is:

1. A cartridge for an endless sound reproducing tape, comprising, in combination, a base member having an opening at one periphery, a tape disc mounted on said base member for rotation about an axis normal to said base member to provide a support surface for an endless, flat tape strip of uniform width, the major portion of said tape strip coiled upon said tape disc in an annular, flat roll with the tape in said coils substantially normal to said base member, said tape disc having an upwardly extending frusto-conical portion, said portion having a peripheral surface adjacent such innermost convolution of said roll which together with the major plane of said support surface defines an acute angle, and with a free loop including a feed portion extending from the innermost convolution of said roll, a return portion extending from the outermost convolution of said roll, and a playing portion intermediate said feed and return portions, a first and a second tape guide positioned on each side of said opening in said base, each of said tape guides having upper and lower guiding edges being disposed in a plane substantially parallel to said base member whereby the tape in said playing portion, when said tape loop is directed around said first and second tape guides, lies substantially parallel to said base member in the vicinity of said opening in said base member, and whereby, the tape in said feed and return portions is turned substantially 90° between said roll and said tape guides.

2. The cartridge of claim 1 in which the angle between said first tape guide and the path of said tape in said playing portion, measured in a plane parallel to said base, is one-half of the angle between the tape path in said feed portion and said playing portion.

3. The cartridge of claim 2 in which the angle between said second tape guide and the path of said tape in said playing portion, measured in a plane parallel to said base, is one-half of the angle between the tape path in said return portion and said playing portion.

4. The cartridge of claim 1 in which said frusto-conical portion comprises a coaxial annular hub of reduced diameter extending axially beyond the tape supporting surface of said tape disc and having a peripheral surface adjacent the innermost convolution of said tape roll extending at an acute angle to said supporting surface whereby said tape feed portion extending from the innermost convolution of said roll is turned in the vicinity of said peripheral surface and extends across said roll to one of said tape guides in a flat position substantially parallel to the upper surface of said tape roll.

5. The cartridge of claim 4 in which the upper guiding edge of said one of said tape guides is parallel to and spaced above the plane of the upper surface of said tape roll whereby the feed portion of said tape extending from the innermost convolution of said roll to said one tape guide lies parallel to and spaced apart from the upper surface of said tape roll.

6. The cartridge of claim 4 in which a portion of the tape supporting surface of said tape disc adjacent the peripheral surface of said annular hub is relieved whereby the portion of the tape coil supported by said relieved portion lies below the remaining portion of said tape coil.

7. A cartridge for an endless sound reproducing tape, comprising, in combination, a base member having a tracking head opening and a drive capstan opening adjacent one another, an annular tape disc mounted on said base member for rotation about an axis normal to said base member to provide a support surface for an endless flat tape strip of uniform width, said tape disc having a coaxial hub extending above said support surface with the peripheral surface of said hub and the major plane of said support surface forming an acute angle, the major portion of said tape strip coiled upon said tape disc in an annular, flat roll with the tape in coils substantially normal to said base member and with a free loop including a feed portion extending from the innermost convolution of said roll, a return portion extending from the outermost convolution of said roll, and a playing portion intermediate said feed and return portions, a first tape guide positioned on one side of said openings and a second tape guide positioned on the other side of said openings, each of said tape guides having upper and lower guiding edges being disposed in a plane substantially parallel to said base whereby the tape in said playing portion, when said loop is directed from said innermost convolution around said first tape guide, thence around said second tape guide and back to said outermost convolution, will be parallel to said base member in the vicinity of said openings, and whereby the tape in said feed and return portions is turned substantially 90° between said roll and said tape guides.

8. The cartridge of claim 7 which further includes a pair of tape guide posts disposed at the opposite side of said tape disc from said tape guides whereby said tape loop, when directed from said second tape guide around said pair of tape guide posts, will join the outermost convolution of said roll at a point advanced, in the direction of rotation of said tape disc, from the point where the other end of said loop joins the innermost convolution of said tape roll.

9. A cartridge for an endless sound reproducing tape, comprising, in combination, a generally planar base member, a peripheral wall extending about said base member, said base member and said wall having a tracking head opening and an adjacent drive capstan opening therein, a cover member extending over said wall and having a pressure roll opening therein opposite said drive capstan openings, an annular tape disc mounted on said base member for rotation about an axis normal to said base member to provide a support surface for an endless flat tape strip of uniform width, said tape disc having a coaxial hub extending above said support surface with the peripheral surface of said hub and the major plane of said support surface defining an acute angle, the major portion of said tape strip coiled upon said tape disc in an annular, flat roll with the tape in said coils substantially normal to said base member and with a first return portion of said strip extending tangentially from the outermost convolution of said roll to form a loop with a second feed portion of said strip extending tangentially from the innermost convolution of said roll, said first return portion extending tangentially in a direction opposite to a desired direction of rotation of said roll and said tape disc and said second feed portion extending in said desired direction of rotation whereby rotation of said tape disc and roll in said desired direction will release tape from the innermost convolution of said roll to said loop and will take up tape from said loop upon the outermost convolution of said roll, a pair of tape guides positioned in line with and on either side of said openings in said base, the guiding edges of said tape guides being parallel to the upper surface of said base member whereby said tape, when directed from the innermost convolution of said roll around said tape guides and back to the outermost convolution of said roll, will lie closely adjacent and parallel to said base member in the vicinity of said openings and whereby the tape in said first return portion and said second feed portion is turned substantially 90° between said roll and said tape guides.

References Cited

UNITED STATES PATENTS

| | | | |
|---|---|---|---|
| 2,661,162 | 12/1953 | Owens | 242—55 |
| 2,778,636 | 1/1957 | Eash | 271—2.18 |
| 2,857,164 | 10/1958 | Camras | 274—4 |
| 3,064,914 | 11/1962 | Meir-Windhorst | 242—55.19 |
| 3,245,630 | 4/1966 | Morris et al. | 242—55.19 |
| 3,287,508 | 11/1966 | Morrison | 179—100.2 |
| 3,326,484 | 6/1967 | Yefsky | 242—55.19 |
| 3,126,162 | 3/1964 | MacKenzie | 179—100.2 |

BERNARD KONICK, *Primary Examiner.*

J. R. GOUDEAU, *Assistant Examiner.*

U.S. Cl. X.R.

179—100.2; 274—11